I. LEBO.
Thrashing Machine.

No. 107,510.  Patented Sept. 20, 1870.

Witnesses:
Edw. F. Brown
Andrew Whitley

Inventor:
Isaac Lebo
By his Atty
S. F. Reigart

United States Patent Office.

ISAAC LEBO, OF WINTERVILLE, PENNSYLVANIA.

Letters Patent No. 107,510, dated September 20, 1870.

---

IMPROVEMENT IN THRASHING-MACHINE SEPARATORS.

---

The Schedule referred to in these Letters Patent and making part of the same

---

*To all whom it may concern:*

Be it known that I, ISAAC LEBO, of Winterville, Berks county, State of Pennsylvania, have invented an Improved Thrashing-machine Separator; and I do hereby declare the following to be an exact description thereof, reference being had to the accompanying drawing and to the letters of reference marked thereon making a part of this specification, in which—

Figure 1:
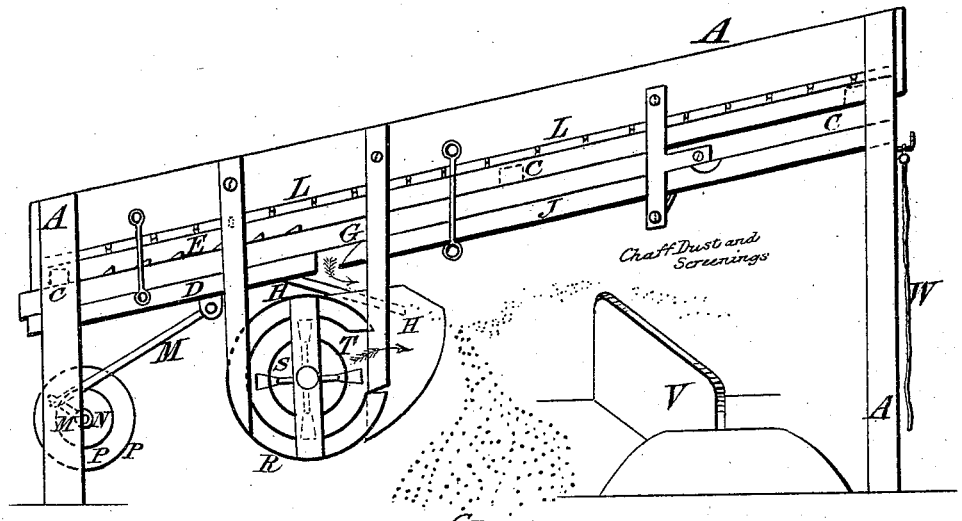
Figure 1 represents a side elevation of the machine.
Figure 2:
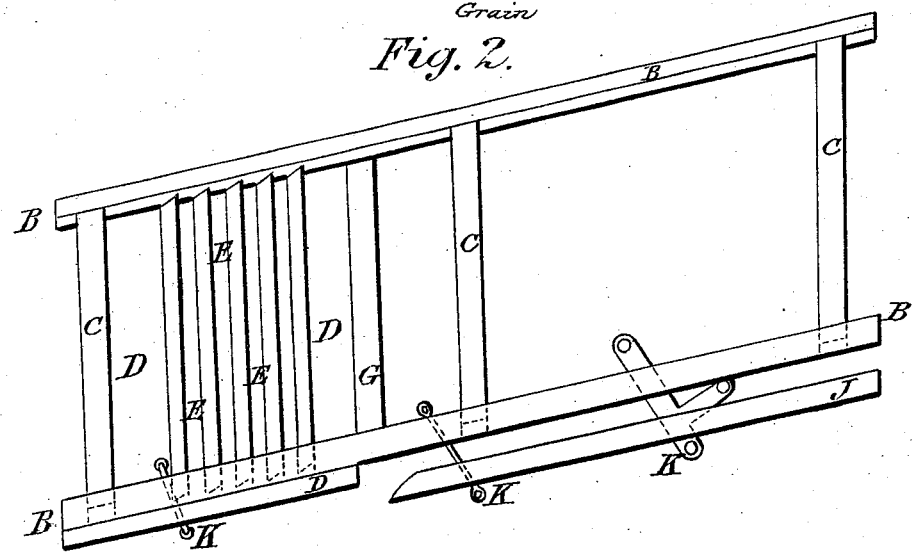
Figure 2 is a perspective view of the floor of the separator.

The nature of my invention consists in the arrangement of a permanent and loose or vibrating floor, the permanent floor having strips with angular edges set across the floor to operate as a rake or fork. The movable floor is smooth and even, and below the opening or division in the floor is the cylinder, with fan-wheel for separating the chaff and dust from the grain.

The object is to expedite the thrashing and cleaning at one operation, saving time and the use of extra hands commonly required by other machines.

To enable others skilled in the art to make and use my invention, I will proceed to describe its construction and operation, as follows:

A represents the frame that supports the devices of the machine.

B, the inside frame that supports and forms part of the shaking floor.

C C C are cross-pieces, mortised into the sides of frame B, to brace the sides.

D is a permanent floor that is attached to the frame B, and has angular strips, E E, across the upper side, that act as shakers to shake out the grain as the straw passes over them, and to throw the grain back to the central opening G, where the grain is discharged upon the incline board H, to be fanned and cleaned as the grain falls upon the ground floor.

The loose or movable floor J swings and vibrates on its pivot-hinges K, at the sides, and shakes and carries the grain (as it falls from the perforated shaker L above) to the central opening G.

The perforated shaker L rests upon the inside frame B, and moves with it as it is operated by the crank and pitman M M, attached to the bottom of the floor D, and the axle N of the band-pulleys P P.

R is the cylinder (underneath the opening G) that contains the fan S, that extends across the under side of the machine, having an opening, T, across its whole length, through which the blast is forced upon the falling grain, to separate the chaff and dust from the grain as it falls down from the incline board H.

V is a chaff-board that is placed underneath the machine, in such a position as to divide the grain and chaff from each other.

W is a hanging curtain or apron, attached to the rear end of the machine, to protect the operator from the dust, and check the chaff from spreading about.

The floors D and J are made of thin boards, but aprons in two parts may be made to answer the same purpose, by revolving on rollers, and discharge the grain near the center of the shaker, or at the opening G.

What I claim as my invention, and desire to secure by Letters Patent, is—

The arrangement of the floor D, with its angular strips E E, central opening G, movable floor J, cylinder R, fan S, and incline board H, when combined and operating as herein described, and for the purposes set forth.

ISAAC LEBO.

Witnesses:
J. FRANKLIN REIGART,
EDM. F. BROWN.